: US010532361B2

(12) United States Patent
Moldovan et al.

(10) Patent No.: US 10,532,361 B2
(45) Date of Patent: Jan. 14, 2020

(54) METHOD AND APPARATUS FOR PRODUCING MILLED ELASTOMER

(71) Applicant: AquaJet Zrt., Harta (HU)

(72) Inventors: Gyorgy Moldovan, Budapest (HU); Gabor Kostyal, Budapest (HU); Ferenc Gyorgy Kostyal, Budapest (HU); Antal Csako, Budapest (HU)

(73) Assignee: AquaJet Zrt., Harta (HU)

( * ) Notice: Subject to any disclaimer, the term of this patent is extended or adjusted under 35 U.S.C. 154(b) by 395 days.

(21) Appl. No.: 15/310,478

(22) PCT Filed: Dec. 5, 2014

(86) PCT No.: PCT/HU2014/000120
§ 371 (c)(1),
(2) Date: Nov. 11, 2016

(87) PCT Pub. No.: WO2016/087884
PCT Pub. Date: Jun. 9, 2016

(65) Prior Publication Data
US 2017/0080604 A1 Mar. 23, 2017

(51) Int. Cl.
*B02C 19/06* (2006.01)
*B29B 17/02* (2006.01)
(Continued)

(52) U.S. Cl.
CPC ............ *B02C 19/06* (2013.01); *B02C 19/061* (2013.01); *B02C 19/063* (2013.01);
(Continued)

(58) Field of Classification Search
None
See application file for complete search history.

(56) References Cited

FOREIGN PATENT DOCUMENTS

| CN | 1923486 A | 3/2007 |
|---|---|---|
| CN | 201175973 Y | 1/2009 |

(Continued)

OTHER PUBLICATIONS

European Patent Office, Notification of Transmittal (Form PCT/ISA/220, 1 pg.), International Search Report (Form PCT/ISA/210, 5 pgs.) and Written Opinion of the International Searching Authority (Form PCT/ISA/237, 10 pgs.), dated Sep. 7, 2015.

(Continued)

*Primary Examiner* — Shelley M Self
*Assistant Examiner* — Jared O Brown
(74) *Attorney, Agent, or Firm* — Wood Herron & Evans LLP

(57) ABSTRACT

The invention is a method for producing milled elastomer, comprising the steps of directing a liquid jet from at least one nozzle on an elastomeric material moving in an at least partially transversal direction with respect to the discharge direction of the at least one nozzle. In the method according to the invention the liquid jet directed on the elastomeric material has a pressure of 650-1350 bar, and the elastomeric material is moved with respect to the at least one nozzle such that, in a first phase adapted for disintegrating a surface of the elastomeric material, the elastomeric material has a first forward-feed rate of 10 to 20 mm/s at a point of impact of the liquid jet in a direction transverse to the discharge direction, and, in a second phase after disintegrating the surface, the elastomeric material has a second forward-feed rate being decreased with 35-65% compared to the first forward-feed rate. The invention is, furthermore, an apparatus for producing milled elastomer.

15 Claims, 9 Drawing Sheets

(51) Int. Cl.
  *B29B 17/04* (2006.01)
  *B29L 30/00* (2006.01)
  *B29K 21/00* (2006.01)

(52) U.S. Cl.
  CPC .......... *B02C 19/065* (2013.01); *B02C 19/068* (2013.01); *B29B 17/02* (2013.01); *B29B 17/0404* (2013.01); *B29B 17/0412* (2013.01); *B29B 2017/0428* (2013.01); *B29K 2021/00* (2013.01); *B29L 2030/00* (2013.01); *Y02W 30/622* (2015.05); *Y02W 30/625* (2015.05); *Y02W 30/68* (2015.05)

(56) References Cited

FOREIGN PATENT DOCUMENTS

| | | | | |
|---|---|---|---|---|
| CN | 201960682 | | 9/2011 | |
| DE | 19648551 A1 | * | 5/1998 | ......... B29B 17/0206 |
| JP | 2005046758 | | 2/2005 | |
| JP | 2005046758 A | * | 2/2005 | ............. B29B 17/02 |
| RU | 2114731 C1 | * | 7/1998 | ............. B29B 17/02 |
| SU | 925670 A1 | * | 5/1982 | ............. B29B 13/10 |
| WO | 2010007455 | | 1/2010 | |
| WO | WO-2010007455 A2 | * | 1/2010 | ......... B29B 17/0404 |
| WO | 2010034504 | | 4/2010 | |

OTHER PUBLICATIONS

European Patent Office, Search Report and Written Opinion issued in corresponding European Patent Application No. 16204264 dated Feb. 28, 2017. 7 pages.

* cited by examiner

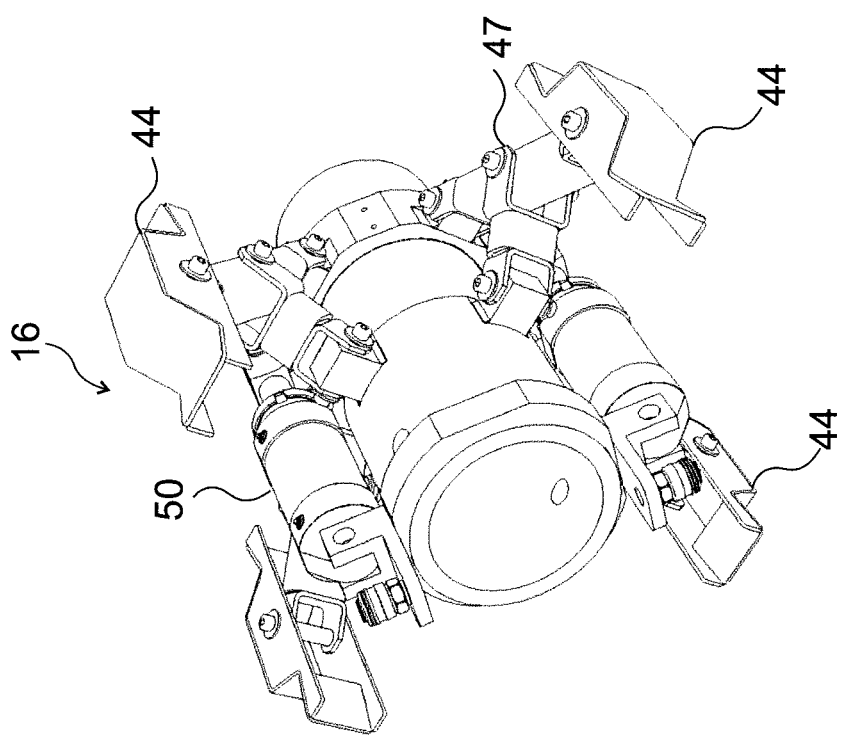

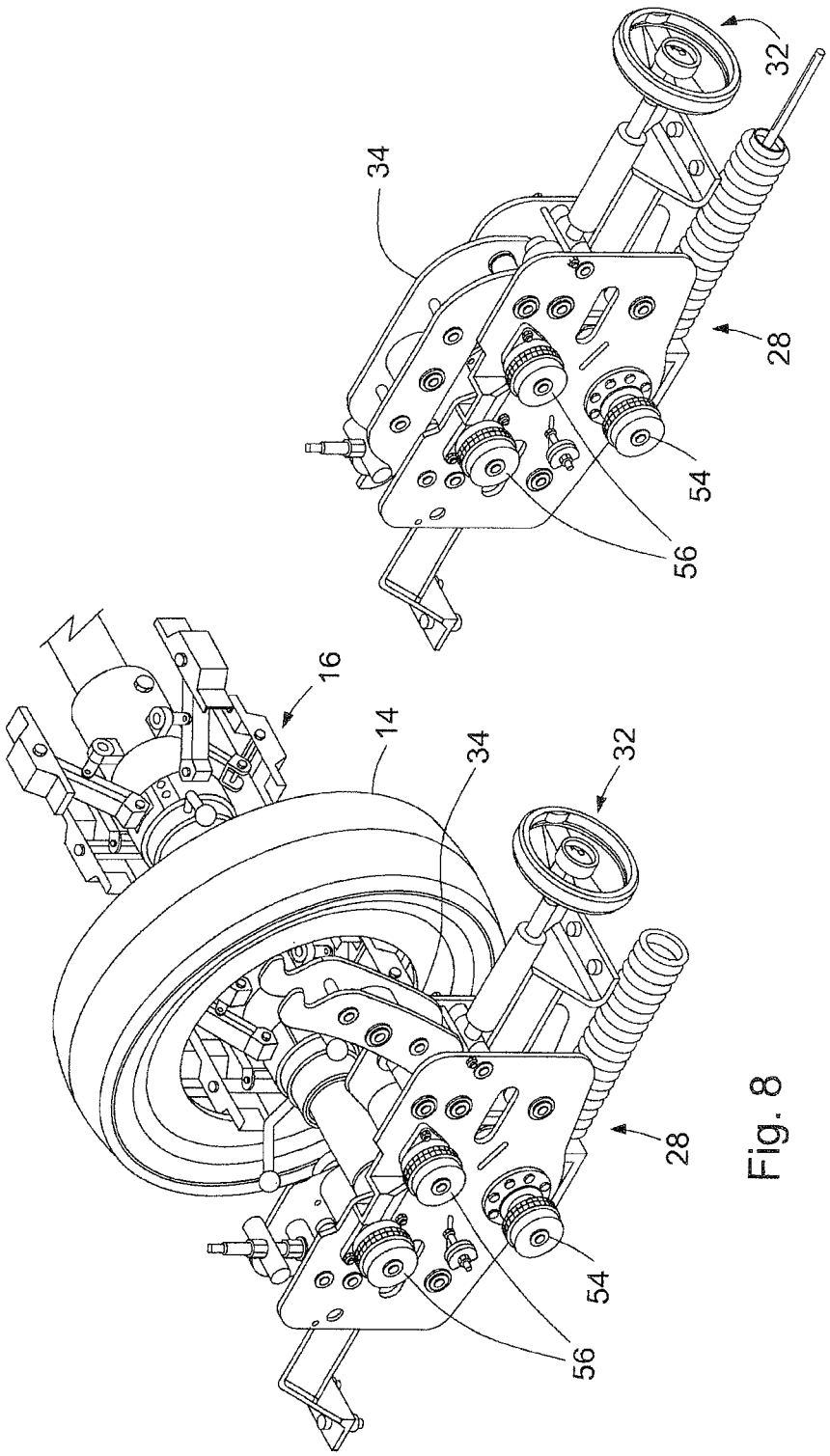

METHOD AND APPARATUS FOR PRODUCING MILLED ELASTOMER

This application claims priority, under Section 371 and/or as a continuation under Section 120, to PCT Application No. PCT/HU2014/000120, filed on Dec. 5, 2014.

TECHNICAL FIELD

The invention relates to a method and an apparatus for producing milled elastomer.

BACKGROUND ART

According to industrial experiences, the direct recycling of used tyres, that is, the direct in-material re-utilization of the rubber material of used tyres is not increasing at a decisive rate in spite of the widespread efforts for recycling. One of the main reasons for that is that high-purity granulates (milled material) being practically free from metals, synthetic fibres and other contaminants, and being produced by conventional mechanical milling, as well as granulates having a small particle size required by direct re-use (i.e. in most cases having a particle size below 400 micron) are made available only by very few recycling companies. The other reason is that the widely applied mechanical milling processes involve milling the entire tyre, making the resulting rubber granulates a mixed-material substance as it will contain all kind of rubbers applied for producing the tyre, and it will also have different composition depending on the proportion of car and truck tyres used for the milling process.

In the methods known in the field, the problems related to the applicability of mixed mechanically produced rubber crumbs are attempted to be solved by subjecting the mechanically produced crumbs to different chemical and mechanical treatments. Accordingly, several different methods are known for producing regenerated material for rubber industry. However, applying these methods involves extra costs, and in many cases the methods were not proven to be economical.

These problems have contributed to the development of the industrial field of high-pressure liquid jet tyre milling and thus there exist several apparatuses adapted for producing rubber crumbs. Many of these known apparatuses and methods are disadvantageous from the aspect of economy due to the size inhomogeneity of the produced rubber crumbs and to their high specific energy demand.

In WO 2009/129906 A1 a process and a plant for the water jet disintegration of materials is disclosed. The objects set for the systems disclosed include, in addition to processing tyres of generally applied sizes, the milling of the elastomeric material of oversized tyres, rubber tracks, conveyor belts and cables applying ultra-high pressure (in excess of 6000 bar) water jets. The document disadvantageously lacks the discussion of the energy-related implications of the applied method, including the problems posed by the generation of milling heat which is a particularly significant phenomenon in the pressure range suggested by the document. Furthermore, the document does not disclose the appropriate fixing and supporting of the various workpieces during milling, and also does not handle the dewatering of the produced crumb slurry and the drying of the end product.

The technological concept according to WO 2009/068874 A1 is more complex than the above detailed solution, providing, in addition to describing the liquid-jet processing of different tyre types, one type of proposal for dewatering the crumb slurry and drying the end product. The objectives of the application also include the processing of oversized (among others, so-called off-the-road) tyres. However, a significant share of these tyres is not entirely of a steel-cord radial type (nevertheless they may comprise steel cord plies in the reinforcement under the tread). According to the document, together with the rubber material the synthetic fibre content of the carcass of the tyre is also milled by the high-pressure water jets, removal of which, depending on the material of the fibres (polyamide, polyester, aramid, etc.) may pose different problems. The presence of synthetic fibre contaminants in the rubber crumbs to be used as recycled material is extremely disadvantageous. Furthermore, the method for processing the tyres is not described in detail in the document. The method disclosed in the document has a further disadvantage, namely that use of abrasive materials is involved in multiple steps of the method, for the removal of which from the rubber material there is currently not known an efficient industrial solution. Besides that, the solution according to the document disadvantageously does not touch upon the problems of energy loss through heat generation during the milling process.

In addition to a comprehensive description of an industrial technological solution, the construction schematics of certain milling apparatuses is also disclosed in WO 2010/023548 A1. The document also does not concern itself with the subjects of the energy efficiency of the milling process and heat generation during milling, yet these effects are very significant in the pressure range (above 3000 bar) specified in the document.

As it can be observed, a recurring deficiency of known solutions is that they either fail to deal with the energy-related conditions of the milling process, or deal with it in an insufficient depth. During high-pressure water jet milling the liquid jet impacting against the surface to be milled has a very significant kinetic energy, resulting basically from the velocity of the liquid jet. According to literature data, this velocity is 630 m/s at a pressure of 2000 bar, while at a pressure of 3000 bar it may reach 780 m/s.

In contrast to the above cited solutions, in WO 2008/084267 A1 a theoretical discussion of the high-pressure (ultra high-pressure) liquid jet milling process is disclosed. According to the document, the energy-related conditions of the milling process are examined in relation to the kinetic energy represented by the high-pressure jet and the so-called tearing energy of the elastomer to be milled.

An apparatus capable of carrying out an ultra-high pressure liquid jet milling process is disclosed in WO 2010/007455 A2. The apparatus according to the document allows for mounting two tyres on a common shaft. During the milling process, the shafts carrying the tyres may be driven from outside the milling space. The tyres are secured to the shaft applying a mechanism supporting the tread of the tyre from the inside.

High-pressure water jet milling processes are disclosed also in WO 01/53053 A1, CN 202498654U, GB 2 339 708 A, DE 196 48 551 A1, CN 200988284Y and CN 101224609A, and in Hungarian patent applications P 11 00429 and P 12 00305. According to Hungarian patent application No. P 11 00429, the working fluid is separated in the course of the method from the produced crumbs, from which the technological heat is recovered by the help of a dedicated solution before recycling the working fluid.

Most of the known solutions have the common disadvantage that a significant amount of heat is generated during the milling process, which results in the intense warming of the working water slurry containing the rubber crumbs produced by the process. Re-cooling this fluid involves wasting energy in two different ways. First, the energy required for heating up the liquid jet is wasted, and second, the warmed-up liquid needs to be re-cooled later, which also requires extra energy.

Therefore, one of the most important problems that is not solved by the known solutions is that for producing crumb elastomer in an economical manner, the energy demand, and thus the energy consumption of the process have to be reduced. In light of the above cited known solutions, therefore, the need has arisen for providing a method and an apparatus for producing milled elastomer by means of which the—preferably homogeneous, fine-grained—milled elastomer can be produced more economically, more efficiently, and with a lower energy demand compared to known solutions.

DESCRIPTION OF THE INVENTION

The primary object of the invention is to provide a method and apparatus for producing milled elastomer which are free of the disadvantages of prior art solutions to the greatest possible extent.

A further object of the invention is to provide a method applying which the milled elastomer—preferably, homogeneous rubber granulates (crumbs) having a uniform particle size distribution—may be produced more economically, more efficiently, and with a lower energy consumption compared to known solutions.

A still further object of the invention is that the specific energy consumption of the high-pressure liquid jet milling of elastomers to be reducible with the invention compared to known solutions. A further object of the invention is to provide an apparatus for producing milled elastomer that is capable of carrying out the method according to the invention in an industrial scale.

The inventive method has been provided based on recognitions stemming from the theoretical analysis of the milling process of elastomeric materials, and the apparatus for milling elastomeric materials, particularly for the controlled milling of the rubber layer of tyre treads, being developed based on these theoretical considerations.

The objects of the invention can be achieved by the method according to claim 1 and the apparatus according to claim 15. Preferred embodiments of the invention are defined in the dependent claims.

BRIEF DESCRIPTION OF THE DRAWINGS

Preferred embodiments of the invention are described below by way of example with reference to the following drawings, where FIG. 7 is an axonometric drawing illustrating the tyre securing mechanism according to an embodiment of the apparatus according to the invention, FIG. 8 is an axonometric drawing illustrating, in an opened state, the support mechanism comprising a drive unit and adapted for securing a tyre mounting shaft of the apparatus according to the invention together with the support shaft, FIG. 9 is an axonometric drawing illustrating the support mechanism according to FIG. 8 in its closed state.

MODES FOR CARRYING OUT THE INVENTION

Figure 2:
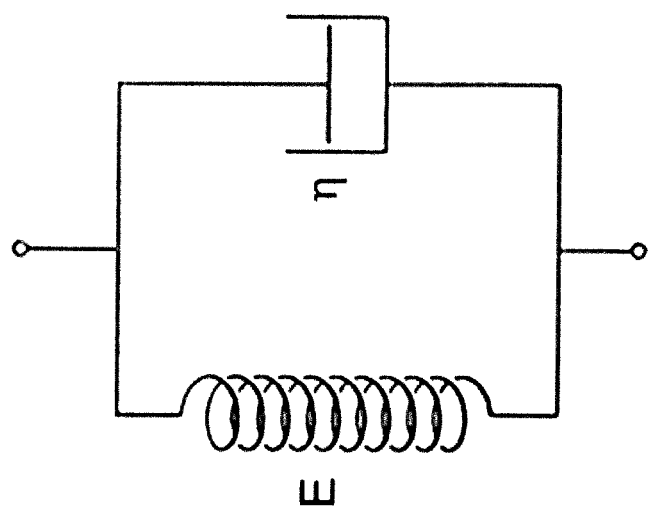
FIG. 2 is a schematic drawing illustrating the Voigt-Kelvin model suitable for describing elastomeric materials.

It is a known phenomenon from the practice of (ultra) high-pressure water jet milling of elastomeric materials is that a significant amount of heat is produced during the milling process, which is manifested itself in warming of the slurry comprising the milled elastomer. The disadvantages caused by this phenomenon can be summarised as follows:

A part of the kinetic energy of the milling liquid jet is transformed into heat during the milling process, i.e. this part of energy does not carry out milling work, it is therefore wasted energy.

The intense warming of the milling liquid causes increased evaporation loss of the liquid. After a milling process has ended, the amount of water to be recirculated for the subsequent milling procedure is reduced by the amount of evaporation upon opening the milling apparatus. The resupply of the working water involves additional costs.

The warmed-up working water separated from the water slurry has to be cooled down. This cooling-down process also demands energy, thus causing additional energy loss. Cooling down the working water is necessary because the water, being separated from the elastomer-containing slurry, is recycled for the subsequent milling procedure, and the high-pressure pumps may only be fed by relatively low-temperature water (having a temperature typically below approximately 30° C.).

It is a fact known from the practise of this industrial branch that in order to produce milled elastomer in quantities considerable from the point of view of applicability, a significant amount of water has to be supplied at the pressure applied for milling. This is preferably achieved applying volume-displacement piston pumps. The high pressure levels applied for milling may also be produced utilising pressure booster pumps, but these can only achieve significantly lower mass flow rates, and are therefore much less suitable for milling materials in industrial quantities in an economical manner.

To understand the mechanism of the warming phenomena, the milling process is analysed below in more detail.

The process of liquid jet milling essentially has three major phases (stages). In known methods identical milling parameters are applied during all of the three phases, i.e. the milling parameters—by way of example, the forward-feed rate—are kept unchanged during the known methods. A milling phase is taken to mean that the high-pressure liquid jet preferably passes once along the surface to be milled, but a single milling phase may also comprise multiple passes over the whole surface to be milled. The three major phases of the milling process can be described as follows:

- In the first phase of the milling process, the kinetic energy of the liquid jet is primarily used to disintegrate the surface of the solid elastomeric material (typically rubber). The elastomeric material is considered to be solid even if it is a tyre and its tread surface has a pattern, since the rubber material of the pattern is solid in itself. A relatively low amount of granulates is separated in this phase, while the crumb slurry becomes heated significantly, even by 20-25° C. relative to the temperature of the milling water, in generally used known apparatuses. Since the tyre surface is disintegrated during this phase, the jet is typically passed over the surface to be milled only once.
- In the second phase, wherein the actual milling of the now disintegrated tyre surface is carried out, the milling effect of the liquid jets is more effective, which manifests in extracting a larger quantity of rubber crumbs (e.g. projected into a single rotation of the tyre). In this second phase the crumb slurry warms up to a smaller extent, analysing this phase alone, the temperature of the slurry increases by approximately 5-15° C.
- The third phase of the milling process is optional; it is applied for example in case of rubber tyres for cleaning the tread surface. For example, in case of tyres with steel cord carcass, the material of the tyre tread is separated and milled down to the steel cord reinforcement plies, i.e. the residual rubber material is milled in this phase. The heating gradient of the crumb slurry is relatively low also in this phase, typically not exceeding 5-15° C.

Based on the experience gained on heat generation in the known processes we have come to the recognition that one of the key factors of utilising the kinetic energy of the liquid jet more effectively is to make more effective the parameters of the first milling phase for disintegrating the surface of the elastomeric material. Based on this recognition we have focused on the analysis of the first milling phase, and hence the conditions of entering of the high-pressure liquid jet into the elastomer were examined as described in detail below.

By the analysis of our results we have recognised that it is expedient to examine the milling process considering also the non-Newtonian fluid characteristics of elastomeric materials.

In elastomers, shear stress depends to a great extent also on the dynamics of the force effect. In this case, it is manifested in the way at the beginning of high-velocity penetration the elastomeric material shows a transient hardness that is considerably larger than the initial (immanent) hardness of the material. Rate of transient hardness depends on the impact velocity.

Thereby, under the effect of a high-pressure and, as described above, high-velocity liquid jet, at the beginning of the penetration—typically for a time period of a few microseconds—the elastomeric material undergoes a very significant transient hardening, which causes a transient increase in the tensile strength and the tearing energy of the elastomer. When the liquid jet is impacted against a hardened material, a greater portion of its kinetic energy is transformed into heat compared to the impact against a non-hardened surface. As the liquid jet penetrates the material, its kinetic energy is reduced, while the tensile characteristics of the elastomer gradually return to their original state, i.e. the function representing the material's deformation response exhibits a decrease.

Figure 1:
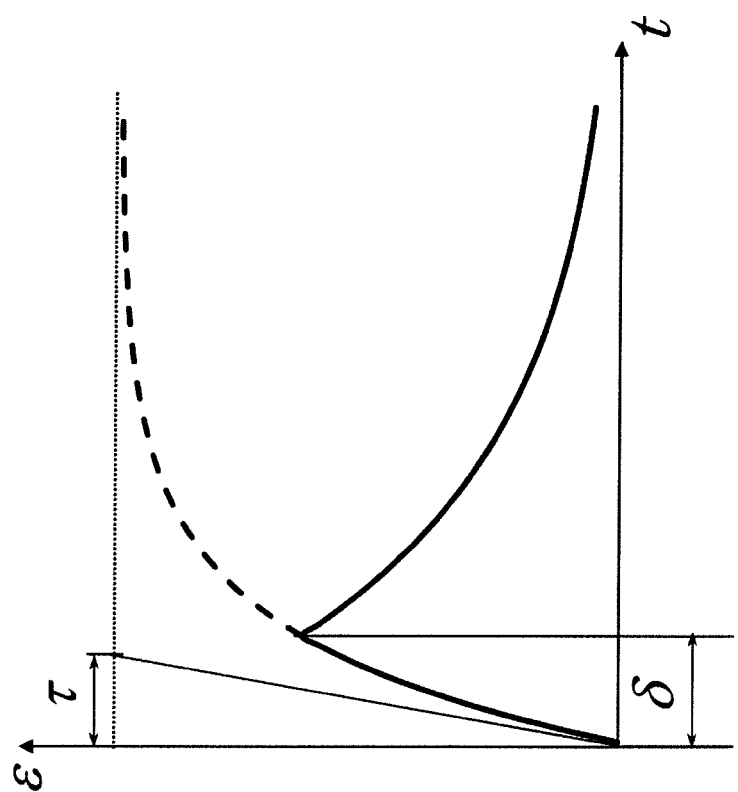
FIG. 1 is a diagram illustrating the transient process of hardening and resiliation of an elastomeric material upon the impact of a high-pressure liquid jet.

The course of the process can be characterized by the diagram of FIG. 1 (continuous-line curve). The references indicated in the figure are explained below.

The function shown in FIG. 1 corresponds to the time plot obtained from the Voigt-Kelvin mechanical model that qualitatively shows the viscoelastic behaviour of elastomers. The model is illustrated in FIG. 2. In the model, the elasticity of the elastomeric material, having a modulus of elasticity E, is represented by a spring, while its viscous nature is represented by a damper having a viscosity factor $\eta$, said damper is connected in parallel with the spring.

The stress equation of the model is the following:

$$\sigma = E\varepsilon + \eta d\varepsilon/dt$$

where
- $\sigma$ is the stress to which the elastomer is subjected,
- E is the modulus characteristic of the elastomer (in the model, the corresponding parameter is the spring constant),
- $\varepsilon$ is the relative deformation parameter of the elastomer, and
- $\eta$ is the viscosity factor, i.e. the damping effect of the damper in the model.

In case of a stress $\sigma$ occurring at the moment when the milling jet penetrates the material, expressing the deformation from the equation, the formula $$\varepsilon(t) = \sigma/E(1 - \varepsilon^{-t/\tau})$$

is obtained, which describes the increase of the value of the deformation parameter during the penetration time $\delta$ of the liquid jet illustrated in FIG. 2. In the formula, $\tau$ is the retardation time, expressed as the ratio of the viscosity factor $\eta$ and the modulus of elasticity E, i.e. the parameter representing the viscoelasticity of the elastomer. As illustrated in FIG. 1, the value of $\tau$ is determined by the tangent line of the deformation run-up curve at the starting point.

The equation describing the relaxation process taking place after the penetration time $\delta$ has elapsed (i.e. of the descending section of the curve, drawn in a continuous line in the figure) is the following:

$$\varepsilon(t) = \sigma/E(1 - e^{-\delta/\tau})e^{-(t-\delta)/\tau}$$

The dashed line in FIG. 1 indicates how the run-up process, having a duration of $\delta$, would continue in case it was not followed by a relaxation resulting from the penetration energy loss.

The equations describing the behaviour of elastomeric materials could be quantitatively solved for the whole piece of material in a very cumbersome way, since the model is capable of representing the behaviour of a single polymer segment only. For an exact description of the behaviour of a given set of molecules, the model has to be multiplied, and, therefore, the solution can be described as an interconnected set of Voigt-Kelvin models (for a more exact description, other model components have to be added). Thus the exact result is obtained by adding up the individual solutions of the set components.

Considering the fact that most elastomers have largely inhomogeneous structure, i.e. the characteristics of the individual molecule groups comprised in the system are different and are difficult to be determined independently, the analysis poses a fairly complex problem also with the application of a finite element method. A further limit to modelling is placed by the indeterminacy of the location of the random structural faults occurring in the elastomer.

Nevertheless, the model is suitable for the qualitative characterisation of the behaviour of the elastomeric material upon the impact of the liquid jet, and of providing a qualitative explanation for the significant amount of heat generated in the first phase of the process.

The above presentation of complexity of the energy analysis in the case of penetration of the milling jet has been intended to show that exact mathematical description of the problem requires a wider-ranging examination. Lacking a theoretical description of adequate depth and possessing only a limited range of practical experience the analytic solution of the problem seems presently unfeasible. Therefore—also in order to prepare a deeper theoretical study—in the following it is examined how the specific energy consumption of material extraction applying high-pressure liquid jets can be reduced taking into account the above described behaviour of the elastomeric material, i.e. how the material extraction process can be made more energy-efficient.

As it is known from earlier analyses, and is known from WO 2008/084267 A1, for the extraction of material during the liquid jet milling process it is required that a kinetic energy exceeding the tearing energy of the elastomeric material is applied. The kinetic energy of the liquid jet is essentially determined by the mass and velocity of the energy transmitting medium.

In known liquid jet milling methods usually the increase of velocity of the liquid jet is regarded as the key factor determining milling efficiency, which can be provided for by increasing the pressure of the liquid applied for separating the material. In the majority of the above referenced patent documents an extremely wide pressure range is defined for the liquid jet. As it is indicated by practical experience, in most cases pressure values in the upper-middle part of these ranges are applied (approximately 3000 bar).

However, as it is seen from the formulas above, the high pressure values applied in known solutions, as well as the resulting high liquid jet velocities lead to the significant transient increase of the strength of the elastomeric material. In other words, the material undergoes a local, transient hardening, which has a dual adverse effect. On the one hand, the liquid jet is not able to penetrate the high transient-strength elastomer to the desired depth (and thereby only a low amount of material can be removed in this phase), and on the other hand, a larger portion of the jet's energy is dissipated and lost as thermal loss.

According to the invention we have recognised that in order that the instantaneous hardening of the elastomer occur at a lower strength level—in analytic terms, that the strength response-function thereof become preferably flattened —, i.e., in order that the hardening of the elastomer is lower, the velocity of the liquid jet, i.e. the milling pressure should be reduced during the first phase adapted for disintegrating the elastomeric material. This recognition of the invention is in contrast with the practice of the industry according to which the cornerstone of increasing milling efficiency is increasing the milling pressure. However, in order to maintain an energy equilibrium, the mass of the medium penetrating the material has to be increased simultaneously with reducing pressure, as shown below, such that the kinetic energy required for material removal (i.e. an energy level exceeding the critical tearing energy) is available.

Since the parameter fundamentally determining the diameter of the liquid jet carrying out the milling of material is the aperture diameter of nozzles applied for emitting the liquid jet, the volume flow rate is dependent on this parameter. Based on the examination of the above described transient phenomena it can be confirmed that for reducing the specific energy consumption of a unit of material removed, the diameter of nozzles has to be increased simultaneously with the reduction of milling pressure.

It has to be emphasised, though, that in addition to physical characteristics, economic considerations are also to be borne in mind when determining the preferred range of nozzle diameter and the corresponding pressure values.

It is also confirmed by our practical experience that increasing the aperture size of the milling nozzles (i.e. increasing the volume flow rate thus mass flow rate of the milling fluid) results in more favourable milling characteristics, even in conjunction with a reduced milling pressure, than increasing only the pressure with a smaller aperture size. However, economic limitations to increasing the milling volume flow rate are the investment and operating costs of high-pressure pumps and their auxiliary systems because the operation of high-pressure, high-volume flow rate pumps requires high-power driving engines.

The investment costs and power demand of pumps with pressure levels suitable for the herein described milling technology place an upper limit on pump selection for an expected level of milling efficiency.

Our practical tests, which in addition to testing corresponding pressure and volume flow rate relations have also incorporated considerations of economy, lead us to the recognition that in case of such nozzle types that are presently widely applied —especially for milling rubber material—, in a preferred embodiment of the invention the preferable nozzle diameter-pressure value pairings are the following:

nozzle diameter: nozzles with a diameter between 0.4 and 0.6 mm (in imperial units: between 0.016" and 0.024")
pressure: between 850 and 1150 bar (in imperial units: between 12300 and 16700 psi)

where higher pressure values correspond to the lower nozzle diameters, and lower pressure values correspond to the higher nozzle diameters.

A basic design consideration of milling systems consisting of one or more high-pressure pumps and one or more milling apparatuses is that the volume flow rate of the liquid supplied by the pump at the required pressure has to be harmonised with the number of milling nozzles. In order to do that, the volume flow rate has to be known for each nozzle as a function of pressure and aperture diameter. To this information certain manufacturers' data may usually be obtained from the manufacturers of the nozzles.

By comparing the volume flow rates of the pump and the nozzles, the number of nozzles to be applied can be determined, which is the basic data for sizing the milling apparatus. The conceptual design of an exemplary tyre tread milling apparatus designed for the thus determined volume flow rate is described below.

The actual nozzle diameter-pressure pairings corresponding to the given milling conditions are highly dependent on the strength characteristics of the elastomer to be milled. As to our experience, tyre materials may be highly different depending on which operational conditions were taken into account by the manufacturer for optimising the characteristics of the material of the tyre, more particularly, the material of the tread. Considering the above described theoretical background and our practical experience, it may be laid down as a general principle that in case of softer rubber materials higher pressure values and smaller-diameter nozzles can be applied, whereas for harder, more wear-resistant materials lower milling pressure values and higher nozzle diameters should be applied.

The pressure values corresponding to the given nozzle diameters may be selected as follows: As it was explained above, high-pressure displacement plunger pumps have a nearly constant volume flow rate. The compression of liquid shall be ignored in the pressure range applied for the present technology. The pressure conditions of such pumps may only be modified applying endpoint feedback control, i.e. by modifying flow rate at discharge port that is determined by the aperture size of the nozzles. In case of greater discharge section area values the endpoint pressure—i.e. the actual milling pressure—can be reduced, with the volume flow rate (and thus the mass flow rate) becoming higher at the same time.

For milling rubber materials having different strength characteristics applying the same milling apparatus, different pressure-volume flow rate pairings are expediently set, preferably by modifying the aperture size of the applied nozzles. In light of above mentioned facts, modifying the aperture size of the nozzles essentially performs a feedback control of the pumps.

Figure 3A:
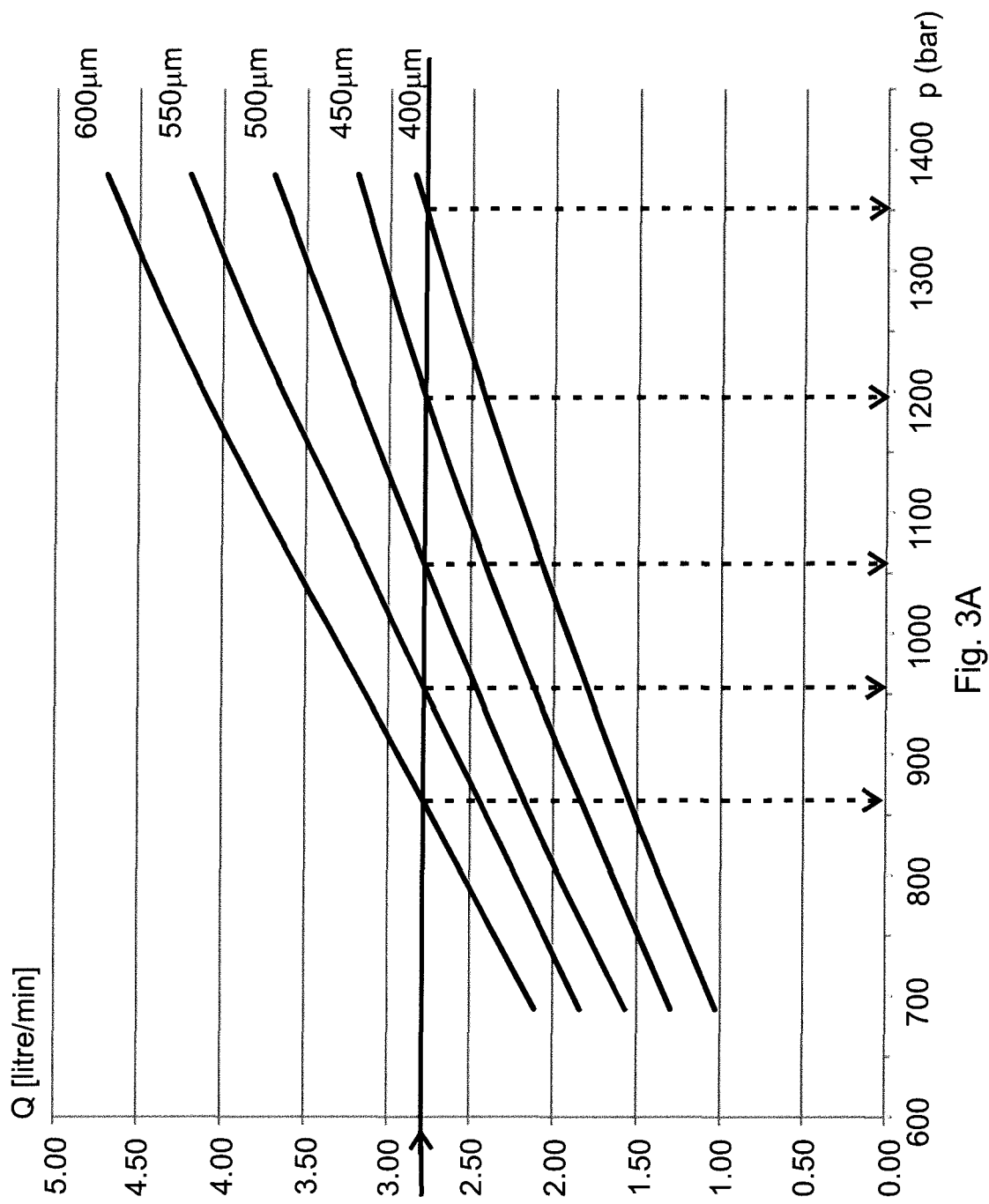
FIG. 3A is a diagram showing pressure-volume flow rate nomograms of nozzles applicable for high-pressure liquid jet milling, and the determination of the pressure value corresponding to a given liquid flow rate and nozzle aperture diameter value.
Figure 3B:
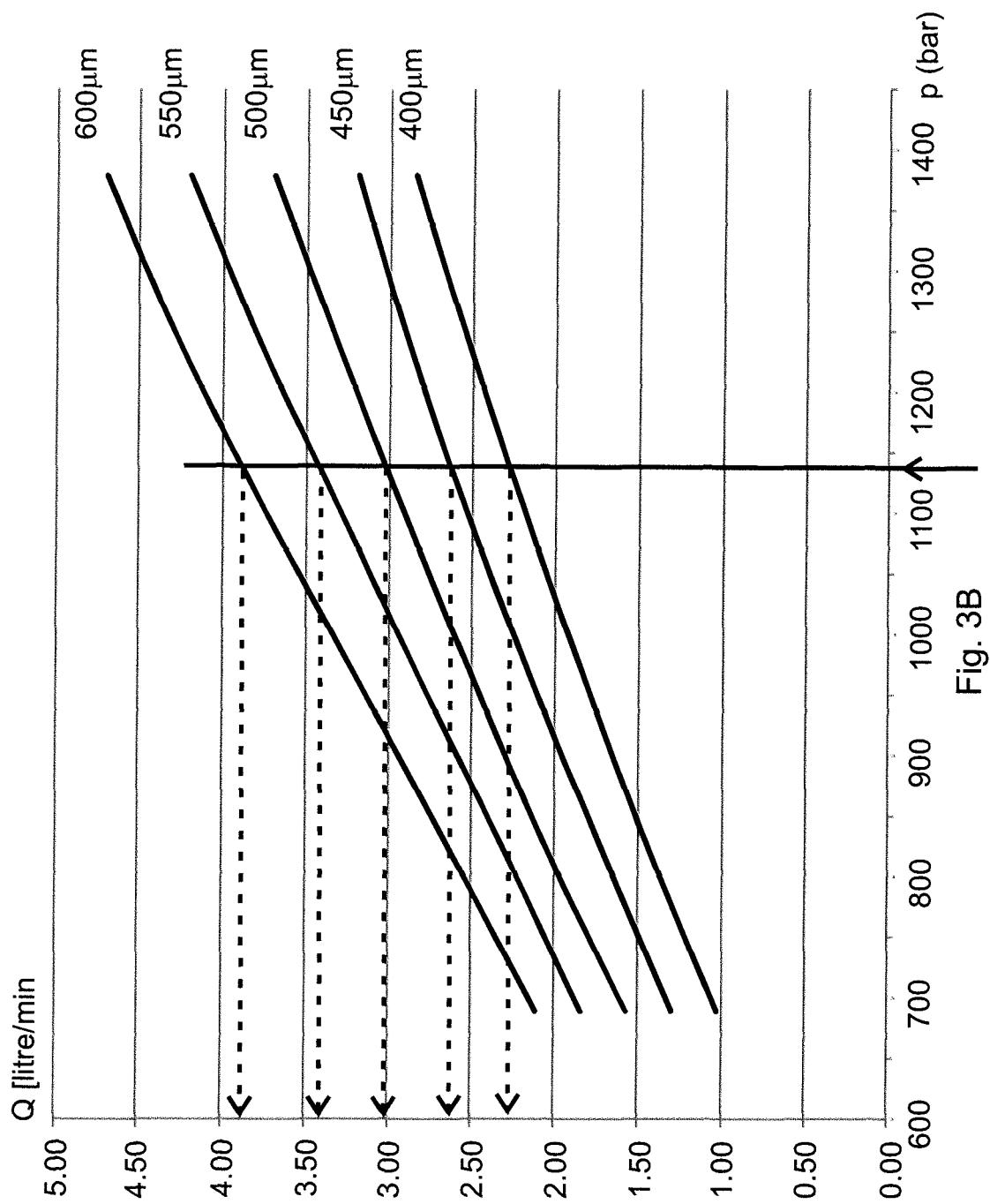
FIG. 3B is a diagram showing pressure-volume flow rate nomograms of nozzles applicable for high-pressure liquid jet milling, and the determination of the liquid flow rate value corresponding to a given pressure and nozzle aperture diameter value.

For the parameters of a given nozzle type, this control procedure is demonstrated in FIGS. 3A and 3B. On the diagrams the milling pressure of the milling fluid emitted from the nozzles is shown (in bars) on the x-axis, while on the y-axis the volume flow rate belonging to different aperture sizes is shown (in litre/min). The curves were set up based on manufacturers' data for nozzle apertures of 600-550-500-450-400 micrometres.

It has to be noted here that the volume flow rate values corresponding to the given nozzle diameter and pressure values using factory measurements data are specified only by some nozzle manufacturers, but in a tabular format. In case, however, if the manufacturers' data are drawn in the form of nomograms shown in FIGS. 3A, 3B, these data can be used for determining milling parameters in a much more preferable manner. The relationships to be presented below cannot be readily understood using the manufacturer's tables, so first the curves shown in FIGS. 3A, 3B have to be set up for the prioritised aperture size range of 400-600 microns and pressure range of 650-1350 bar.

The generated nomogram may preferably be used in two different ways according to FIGS. 3A and 3B. According to the first way of using the nomogram, illustrated in FIG. 3A, the milling pressure values applicable for milling elastomers of different hardness based on the volume flow rate of the high-pressure pump that is either readily available or is selected on the basis of practical considerations, such as its driving power demand. In the embodiment illustrated in FIG. 3A, therefore a pressure-volume flow rate nomogram is set up for the nozzle type of at least one nozzle, and, for a given volume flow rate, the pressure of the liquid jet can be determined, in the range of 650-1350 bar, based on the aperture diameter of the at least one nozzle by means of the pressure-volume flow rate nomogram.

The second way in which the nomogram may be utilised, illustrated in FIG. 3B, is for determining the different nozzle volume flow rate values corresponding to the milling pressure values defined previously. In the embodiment illustrated in FIG. 3B, therefore, a pressure-volume flow rate nomogram is set up for the nozzle type of at least one nozzle, and, for a given liquid jet pressure selected from the range of 650-1350 bar the volume flow rate of the liquid jet can be determined based on the aperture diameter of the at least one nozzle by means of the pressure-volume flow rate nomogram.

FIG. 3A is intended for determining the nozzle pressure values corresponding to the volume flow rate of a high-pressure pump that is either readily available or is selected e.g. based on its power consumption. Pressure values can be determined by first determining the volume flow rate of a single nozzle using the volume flow rate value of the given high-pressure pump and the number of applied nozzles, and then drawing a horizontal line perpendicular to the y-axis at the determined value of volume flow rate, and intersecting the characteristic curves of the nozzles with different apertures included in the nomogram. By taking the projection of each intersection point on the x-axis the milling pressure values achievable using the given nozzles are obtained. Of course, this method provides exact milling pressure values for all of the nozzles in one milling head if the nozzles have identical aperture diameters.

The other use of the nomogram, illustrated in FIG. 3B, is preferably applied for determining the volume flow rate required for milling, and thereby provides an aid for selecting the high-pressure pump. In case the milling pressure preferably applied for milling the given elastomeric material (e.g. the rubber layer of a tyre tread) was determined previously, a line is drawn perpendicular to the x-axis at the given pressure value, intersecting the characteristic curves representing different nozzle aperture sizes. By taking the projection of each intersection point on the y-axis the volume flow rate values corresponding to different nozzle aperture sizes are obtained. The volume flow rate of the pump applied for achieving the required milling pressure is obtained by multiplying the selected volume flow rate value by the number of the nozzles applied in the one or more milling apparatus.

It has to be noted that in the above described method the internal pressure losses of the apparatus, as well as that of its high-pressure supply line, were ignored. These internal pressure losses may be easily determined by persons skilled in the art.

As it is known from the linearly aligned jet milling technology, the jets facing the surface to be milled are preferably vibrated with a predetermined frequency. According to our practical experience, the vibration frequency preferably applicable in conjunction with the pressure values—and the forward-feed rate values to be described later on—applied according to the invention is in the range of 650-850 l/min, where lower and higher values, respectively, correspond to harder- and softer-structure materials. The at least one nozzle is expediently vibrated in a direction perpendicular to the direction of travel of the elastomeric material, as well as to the discharge direction. The exact value of the vibration frequency depends on the actual consistency of the rubber material to be milled, and may be determined from the results of test milling runs.

It is important to emphasise that, although our method and its corresponding apparatus according to the invention to be described below were introduced in relation to linearly aligned jet milling technology, the nomograms demonstrated on FIGS. 3A and 3B, as well as their application for selecting the advantageous milling nozzle aperture sizes can be applicable also for improvement of milling efficiency of rotating-head jet milling technology.

The three major phases of the milling process, namely, the surface disintegration phase (first phase), the so-called productive milling phase (second phase), and the residual material removal phase (third phase) were described above. In case the material of a tyre tread is to be milled, each phase preferably requires a single revolution of the tyre. As it is presented below, preferred milling parameters may also be defined for the third phase, but for the efficiency of the process it is of lower importance whether parameters identical to the second phase are applied also in the third phase or the parameter values are modified compared to the second phase.

In conjunction with identifying the different functions of the phases we have also recognised that, in addition to the predetermined basic milling parameters (that are not-modifiable or difficult-to-modify during the milling operation), the forward-feed rates applied in the course of the different phases play also significant role. The term 'forward-feed rate' is used to refer to the velocity of relative motion of the group of nozzles performing the milling and the elastomeric material to be milled. The relative motion is, in case of linearly arranged nozzles, in the direction perpendicular to the vibration direction of the row of nozzles, and, in case of rotating-head milling in any direction parallel with the surface to be milled. From the aspect of the milling process it is indifferent whether the forward-motion is carried out by the milling jets (i.e. the nozzles) or the workpiece itself, or both are moved with a predetermined velocity difference.

It can be recognized that, in addition to the preset basic milling parameters—such as milling pressure and vibration frequency—the forward-feed rate of the vibrated liquid jets applied during the different phases also bears significance, because in case of a too high forward-feed rate there is less time for the milling jets to penetrate into the material, while too low forward-feed rate would cause the milling jet to stay at a given location for too long, resulting in wasted energy.

In accordance with the considerations put forward above, the inventive method for producing milled elastomer is carried out as follows. In the course of the method according to the invention a liquid jet having a pressure of 650-1350 bar is directed from at least one nozzle on an elastomeric material moving in an at least partially transversal direction with respect to the discharge direction of the at least one nozzle. Exploiting the tearing effect of the liquid jet, milled elastomer is separated from the surface of the elastomeric material, i.e. the milled elastomer is produced from the elastomeric material by means of the liquid jet. The particles of the milled elastomer are essentially torn off from the elastomeric material by the liquid jet. Under the feature that the elastomer is at least partially moved in a transverse direction relative to the discharge direction of the at least one nozzle it is meant that its motion has a component perpendicular to the discharge direction, i.e. the surface to be disintegrated by the liquid jet is not parallel with it.

According to the above, more than one nozzles arranged linearly beside one another, or one or more nozzles arranged in a rotating-head may also be applied for carrying out the inventive method.

In the course of the method according to the invention the elastomeric material is moved with respect to the at least one nozzle in such a way that in the first phase for disintegrating the surface of the elastomeric material the elastomeric material has a first forward-feed rate of 10 to 20 mm/s at the point of impact of the liquid jet in a direction transverse to the discharge direction, and, in the second phase after disintegrating the surface of the material the elastomeric has a second forward-feed rate being decreased with 35-65% compared to the first forward-feed rate.

In case of rotating-head milling, the 'forward-feed rates' applied in each phase of the milling process are taken to mean the relative advancing velocity of the axis of rotation of the rotating milling head and the workpiece to be processed.

From the aspect of milling effect the most significant role is played by the component of the velocity of the elastomeric material perpendicular to the liquid jet, and thereby for specifying the method according to the invention and also in the following this velocity component will be regarded as the forward-feed rate. Therefore, by way of example in case of a tyre, the forward-feed rate is the circumferential velocity of the tyre.

According to the above, in a preferred embodiment of the inventive method a liquid jet having a pressure of 850-1150 bar is directed on the elastomeric material.

In the first phase adapted for disintegrating the surface of the elastomeric material, the productive milling is limited, since during this phase the milling jets perform the disintegration of the surface to be milled. Our experiments have led to the conclusion that in a preferred embodiment of the inventive method the forward-feed rate to be applied in the first phase should be preferably in the range of 12.5-17.5 mm/s, particularly preferably in the range of 14.2-15.8 mm/s. In case of these forward-feed rate values, nozzle diameters between 0.4 and 0.6 mm, and/or pressure values between 850 and 1150 bar are preferably applied. Accordingly, the specified preferred nozzle diameter range (between 0.4 and 0.6 mm) may also be applied by milling pressure values falling in the pressure range according to the invention (between 650 and 1350 bar).

In the first phase, therefore, excessive heat generation should be especially avoided. In order to achieve this, a reduced milling pressure is applied during the entire course of the inventive method compared to known solutions, and, besides that, the nozzle aperture diameter is preferably increased to provide that the liquid jet has a kinetic energy exceeding the critical tearing energy. In addition to these arrangements, in the first phase, the forward-feed rate is set to a relatively high value such that the liquid jet stays for a relatively short time in a surface region just subjected to milling of the elastomeric material so that the surface is kept from hardening as much as possible, i.e. the smallest possible amount of heat is generated during disintegration of the surface. In our experiments we have recognized that for the above specified pressure values, during the first phase of the process the forward-feed rate should preferably be in the range of 10-20 mm/s (taking into account the hardness of the elastomeric material to be milled, i.e. for a harder elastomeric material a lower value, while for a softer material a higher value should be chosen), such that the balance between disintegrating the surface to the required extent after the first phase and generating as limited heat volume as possible.

Our experiments have also shown that the optimum of the first forward-feed rate is in the range of 14.2-15.8 mm/s. This range is advantageous also for widely applied tyres that have average hardness. Our experiments have indicated that in the first phase with this parameter the heat generation, i.e. the rise of temperature of the working fluid may be reduced to approximately 5-15° C., roughly equal to the values measured in the other phases. It is important to note that the extra energy required for producing the first forward-feed rate (which exceeds the forward-feed rate applied in the second phase) is negligible with respect to the energy that may be saved by changing the forward-feed rate between the process phases, i.e. by preventing the milling liquid from warming up.

Following the first phase, during the second "productive milling" phase, the row of milling jets moves forward slower relative to the elastomeric material to be milled. Applying this reduced forward-feed rate in the second phase—as in an already partially disintegrated surface the hardening phenomenon occurs to a much smaller extent compared to the surface hardening occurring in the first phase—a deeper milling penetration may be achieved with the same liquid jet pressure than in the first phase. The forward-feed rate applied in the second phase is lower by 35-65%, preferably by approximately 50%, than the first forward-feed rate, and thus falls in the range of 5-10 mm/s. Our experiments have shown that in the second phase it is expedient to set a forward-feed rate the smaller the better in order to achieve the highest possible extraction rate per revolution. Besides that, similarly to the first forward-feed rate the second forward-feed rate is also determined as a function of the hardness of the elastomer to be milled, that is, higher second forward-feed rate values (e.g. values near the upper value of the specified ranges) will correspond to higher first forward-feed rates. If, however, the first forward-feed rate is selected from the lower values of the specified range, the second forward-feed rate will also be selected from the lower values of the 5-10 mm/s range. Thereby, in accordance with what was put forward above, a forward-feed rate reduction of 35-65%, preferably approximately 50%, is applied in every case between the first and the second phases.

However, applying too low milling velocities is also disadvantageous because in case the liquid jet stays in a given region for too long it can penetrate into the deeper layers of the elastomeric material—in specific cases, even into the support layer—which may lead to the increase of the temperature of the working fluid. Thereby, an optimum velocity range may be established for the second phase, wherein both of the above disadvantageous effects may be prevented to the greatest possible extent in a particularly preferable manner. In our experiments we have found that, according to the above, the second forward-feed rate is expediently selected from the range of 6.5-8.5 mm/s.

Thereby, in the phase of productive milling (second phase) it is expedient to apply lower forward-feed rates, because that way deeper penetration into the disintegrated surface (and thereby, higher material removal) can be achieved applying an unchanged milling pressure value. At the same time, the rate of the vibration of the row of liquid jets remains the same as in the first phase. Applying too low forward-feed rate values is not preferable also because in case of too long liquid jet exposure times the milling jet penetrates into deeper layers of the material and loses so much energy that its energy will no longer exceed the tearing energy of the elastomer, and thereby will become incapable of milling the lower layers.

Applying the above specified narrowed velocity ranges, in an embodiment of the method according to the invention the second forward-feed rate applied in the second phase is obtained by reducing the first forward-feed rate preferably by 45-55%, particularly preferably by approximately 50%.

According to what was put forward above, in the second phase the rate of the possibly applied nozzle vibration, as well as the applied fluid pressure values are the same as in the first phase. From a technological aspect it is relatively simple to change the forward-feed rate between the phases, but changing the milling pressure or modifying the diameter of the nozzle apertures during operation would be very unreasonable.

In the third, so-called "cleaning" phase the liquid jet is applied for removing the residual material being present to a limited extent. For this operation a third forward-feed rate can be applied, which is larger than the second forward-feed rate, and thereby the third forward-feed rate of the third phase (applied after the second phase) is selected from the similar range (10-20 mm/s) as the first forward-feed rate. In the third phase the preferred forward-feed rate range is again 12.5-17.5 mm/s, while the particularly preferred velocity range is 14.2-15.8 mm/s. Similarly to what was described above, the rate of the possibly applied vibration of at least one nozzle, as well as the originally set milling pressure value are the same as before.

In case of milling an average tyre tread worn to a layer thickness of 16 mm or less, the first phase of the process will take one revolution, the second phase may be completed in 2-3 revolutions, while the third phase would also require a single revolution of the tyre. When a thicker layer of elastomeric material (e.g. rubber) is to be milled, the number of revolutions required to complete the second phase increases by one for every 3 mm of additional layer thickness.

The change in the forward-feed rate from phase to phase is achievable by controlling the milling apparatus. For milling a tyre, this means that the control unit of the apparatus switches to the forward-feed rate of the subsequent phase each time a new phase is started.

Certain embodiments of the invention relate to an apparatus adapted for carrying out the inventive method described above, i.e. for producing milled elastomer. The apparatus according to the invention may therefore be applied for carrying out the inventive method, i.e. the design of the apparatus may be dimensioned, and the operation of the apparatus can be controlled according to the method according to the invention. Accordingly, the apparatus according to the invention comprises preferably such a control system that, in addition to being adapted for controlling the basic functionalities of the apparatus, is capable of programming and storing control packages implementing two or more forward-feed rates, which implies that by controlling the apparatus two or more different forward-feed rates can be realised.

The apparatus according to the invention comprises a housing comprising a milling space and preferably also crumb slurry containers, a tyre mounting shaft adapted for mounting a tyre—for preferably four tyres—in the milling space, a drive unit adapted for supporting and rotating the tyre mounting shaft, and at least one nozzle being positionable along the circumference of the tyre when the tyre is secured to the tyre mounting shaft. Each nozzle is capable of emitting a liquid jet having a pressure for example in the range as specified above, i.e. between 650-1350 bar, but if so required the apparatus is capable of milling at pressure levels both lower and higher than that.

Mounting four tyres is advantageous also because when four tyres are milled simultaneously the apparatus can be operated more efficiently than apparatuses capable of the simultaneous milling of two tyres. However, mounting more than four tyres poses problems for shaft movement and balancing, and milling such a number of tyres simultaneously is problematic from the aspect of the construction of the apparatus. In addition to a drive unit adapted for driving the tyre mounting shaft at an end thereof, the apparatus according to the invention comprises a support mechanism adapted for securing the tyre mounting shaft and also allowing the removal of the tyre mounting shaft by releasing the securing.

Figure 4:
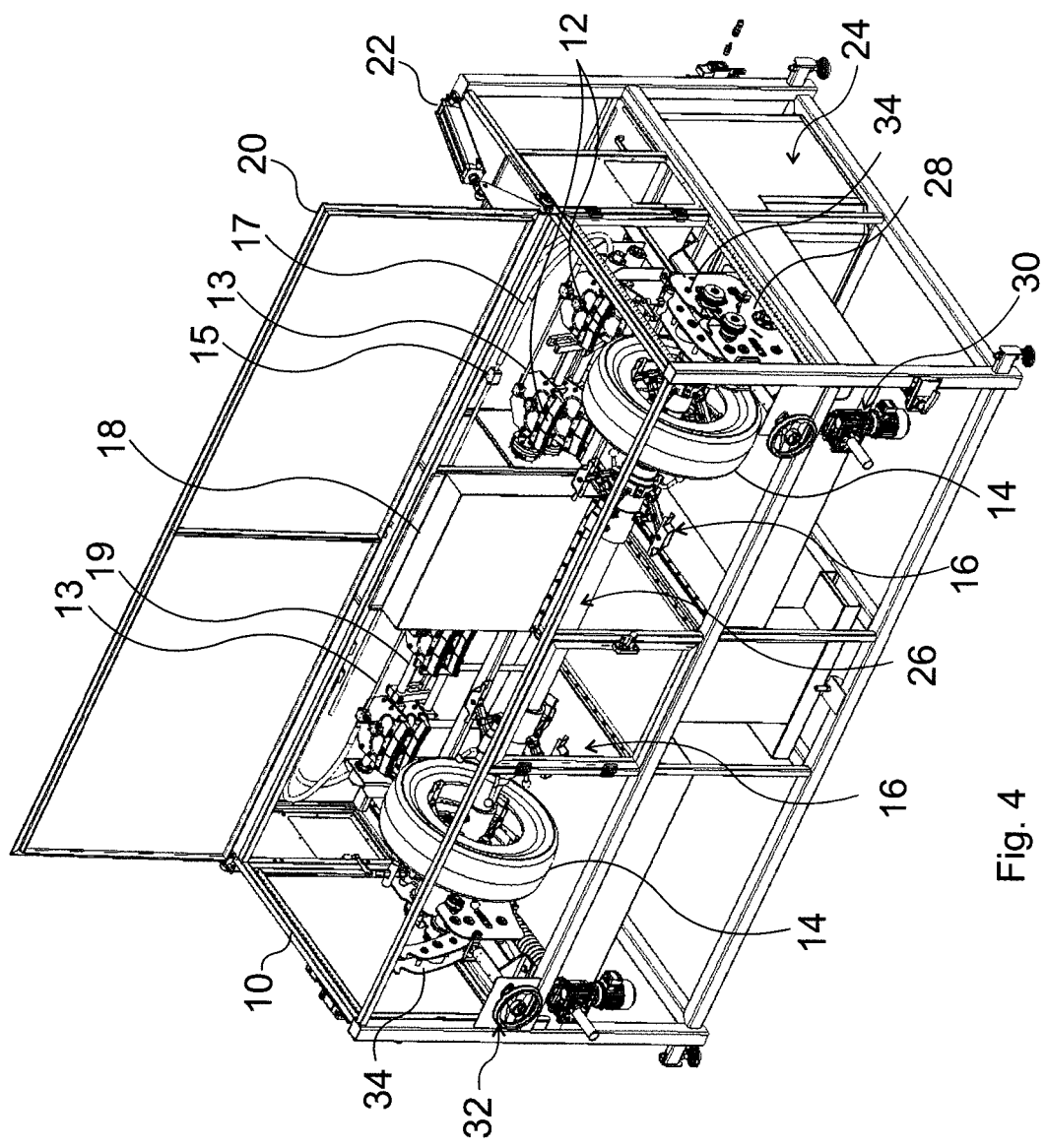
FIG. 4 is an axonometric drawing illustrating such an embodiment of the apparatus according to the invention, which is adapted for milling four tyres.

FIG. 4 illustrates an embodiment of the apparatus according to the invention. The apparatus to be described below is preferably applied especially for removing and milling the material of the tread portion of steel-cord radial tyres of utility vehicles, yet the illustrated embodiment can be advantageously applied for milling of elastomeric material of the tread of other types of tyres or other ring-shaped bodies (e.g. solid tyres).

The apparatus may provide a relative motion system of the high-pressure liquid jets (typically water jets) and the workpiece to be milled which provides that the liquid jet entering the workpiece removes from the workpiece fine crumbs having a predetermined, uniform particle size distribution.

This is preferably achieved by vibrating of a set of liquid jets arranged linearly in the plane of the jets being emitted, and at the same time moving the workpiece in front of the row of milling jets with a predetermined forward-feed rate. In case of tyres, applying a forward-feed rate to the workpieces corresponds to rotating the tyres with a specific angular velocity.

The general appearance and major structural components of the present embodiment of the apparatus are shown in FIG. 4, while certain components of the present embodiment of the apparatus are illustrated in FIGS. 5 to 9.

FIG. 4 shows an apparatus for producing milled elastomer, comprising a housing 10. A vibration-driving device 18 adapted for the two-side symmetric oscillation of the liquid jet milling head assemblies 12, is arranged in the middle of the housing 10. The clamp-fixed milling head assemblies 12 are mounted on vibrating shafts 19 driven by the vibration-driving device 18. The high-pressure milling water is fed in the apparatus through feed nipples 15 arranged at the top, whence the milling head assemblies 12 are supplied with water through flexible hoses 17. During operation, the working space of the apparatus is covered by a tiltable machine cover 20 adapted to be moved by pneumatic cylinders 22. The produced water-containing rubber crumb slurry is collected in slurry containers 24 arranged in the lower part of the apparatus.

As it is illustrated also in FIG. 4, in the method and apparatus according to the invention a row of linearly arranged nozzles is preferably applied.

A tyre mounting shaft 26, capable of mounting multiple tyres 14, is lifted in and out in the opened state of the machine cover 20, preferably applying a crane. In the present embodiment, the tyres 14 are secured by means of supporting shoes 44 fastened by a scissor mechanism 47. Details of the tyre securing mechanism 16 comprising the scissor mechanism 47 and the supporting shoes 44 are illustrated in FIG. 7. The tyre mounting shaft 26 sits on a driven support mechanism 28 having two-side driven rollers, and the tyre mounting shaft 26 being driven by drive units 30. Details of the support mechanism 28 are shown in FIGS. 8-9.

In the present embodiment, the distance between the tyre mounting shaft 26 and the milling head assemblies 12, determined by the size of the tyres 14 can be adjusted applying a wheel-operated spindle mechanism 32. The tyre mounting shaft 26 is fixed on the support mechanism 28 and is secured from above during operation by brackets 34 fixed in their turned down position. The bracket 34 is shown in FIG. 8 and FIG. 9, respectively, in its lowered and lifted position.

Figure 5:
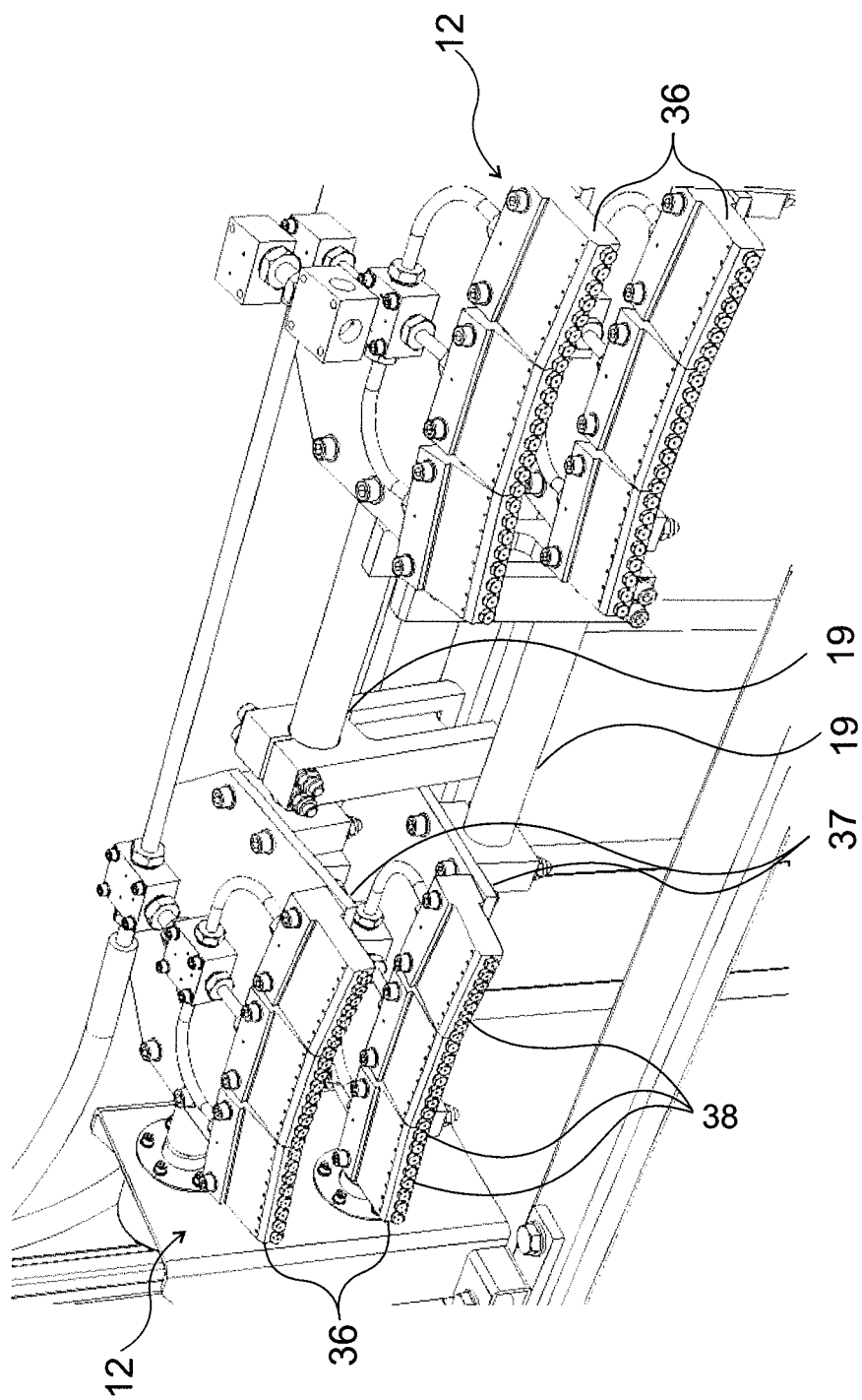
FIG. 5 is an axonometric drawing illustrating a dual row of nozzles comprised by an embodiment of the inventive apparatus.
Figure 11:
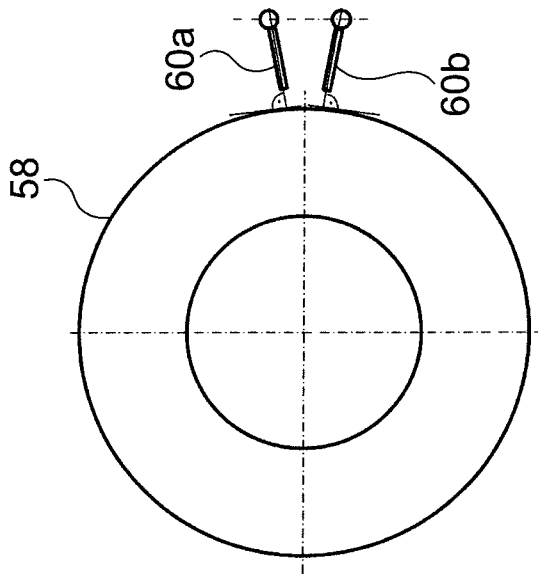
FIG. 11 is a schematic drawing illustrating a further possible arrangement of the dual row of nozzles applicable in the method and apparatus according to the invention.
Figure 10B:
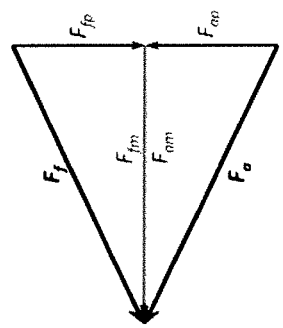
FIG. 10A is a schematic drawing illustrating a possible arrangement of the dual row of nozzles applicable in the method and apparatus according to the invention, FIG. 10B illustrating schematically the force vectors of the liquid jets in the arrangement according to FIG. 10A.
Figure 10A:
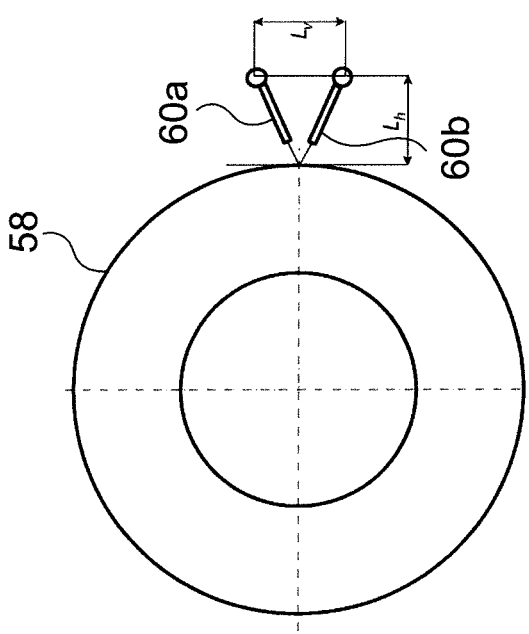

The efficiency of the milling process may be improved by doubling the milling heads 36 in the milling head assembly 12, preferably in a manner shown in FIG. 5, arranging the milling heads 36 above each other. Accordingly, in an embodiment of the apparatus according to the invention, dual rows of nozzles are applied comprising a first row of nozzles and a second row of nozzles arranged parallel with each other. Referring now to FIGS. 10A, 10B, and 11, the advantages of applying dual nozzle rows are detailed below. Dual rows of nozzles may preferably be applied also for the purposes of the method according to the invention.

As shown in FIG. 5, the two rows of nozzles have identical configuration. FIG. 5 shows the nozzles 38 of the milling head assemblies. The milling head assemblies 12 are secured to the vibrating shaft 19 by means of clamps. The axial position and tilt angle (with respect to the horizontal plane) of the milling head assemblies 12 can be adjusted by means of the fastening screws of the clamps. The milling head assembly 12 may be fixed at the desired angular position by tightening the screws.

Figure 6:
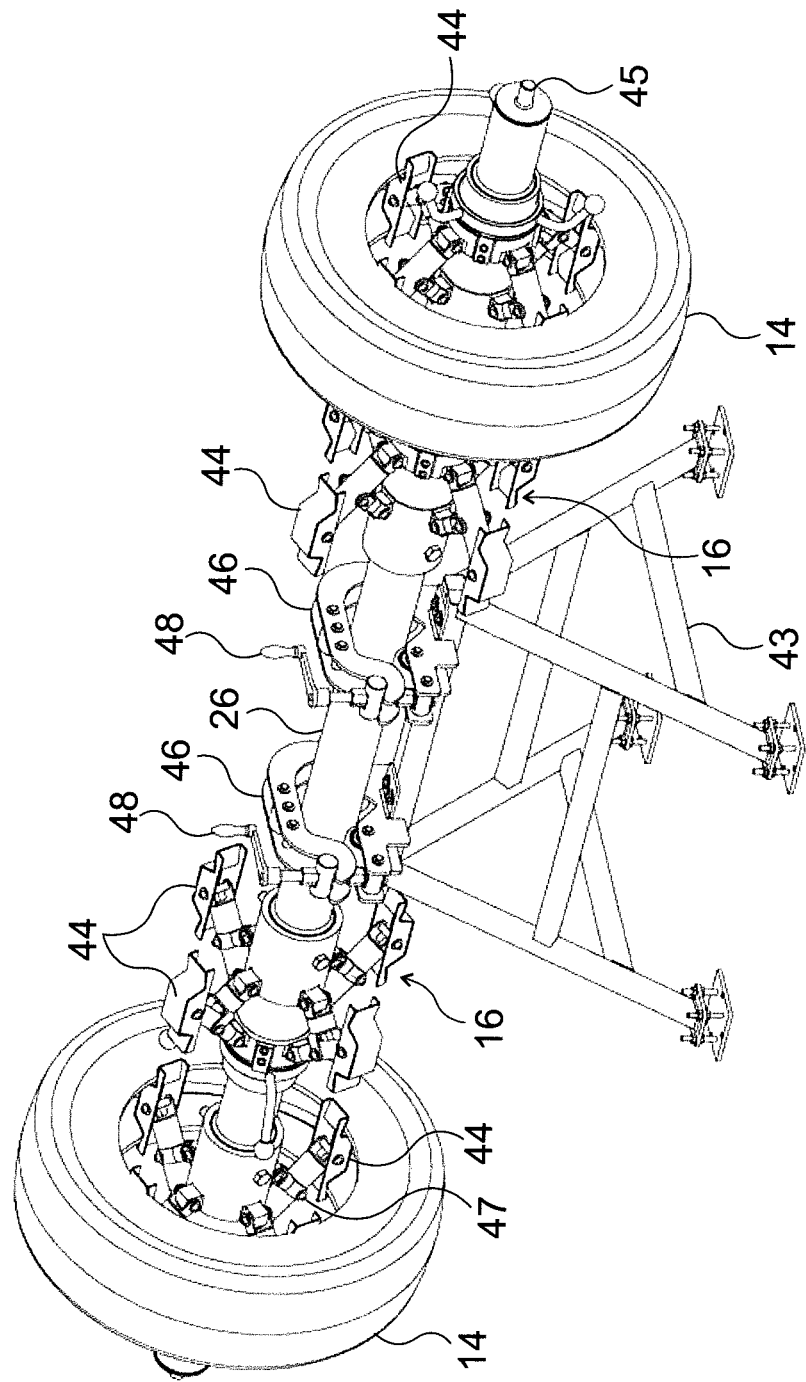
FIG. 6 is an axonometric drawing illustrating a tyre mounting shaft applicable in the inventive apparatus, the mounting shaft being disposed on a support stand.

To increase milling productivity, the present embodiment of the apparatus is adapted for the simultaneous processing of four tyres 14, whereby the machine setup time calculated for a single tyre 14 can be significantly reduced. By assigning two tyre mounting shafts 26 for a single apparatus according to the invention, during the milling of the tyres mounted on the tyre mounting shaft 26 loaded in the apparatus, the already processed tyres can be removed from the other tyre mounting shaft 26 placed on a suitable support stand 43, and the four tyres to be milled during the next milling run may also by mounted thereon. The tyre mounting shaft 26, secured to the support stand 43, is shown in FIG. 6. The same support stand 43 may be applied for cleaning (washing) the four tyres to be processed before being loaded into the apparatus. Washing of tyres is necessary to provide required chemical purity of the milled elastomer end product. To ensure the uninterrupted loading and unloading of the apparatus, two support stands 43 are required: the tyre mounting shaft 26 carrying the already processed tyres is received by the empty support stand 43 after being removed from the apparatus, while the tyre mounting shaft 26 prepared for processing may be loaded into the apparatus from the other support stand 43. The tyre mounting shaft 26 may be secured to the support stand 43 applying clamps 46 and locking levers 48.

The tyres 14 are preferably mounted on the tyre mounting shaft 26 exploiting the internal strength of the steel cord carcass of the tyre 14 which allows the tyre 14 to be mounted through the bead rims thereof. It has to be noted here that tyres without a steel cord reinforcement structure were found in our experiments to be sufficiently strong for being mounted on the tyre mounting shaft 26 in a manner illustrated in FIGS. 4 and 6. Applying the tyre securing mechanism 16 shown in FIG. 7, in order to secure the tyre 14 in the apparatus it is sufficient to press the appropriately shaped supporting shoes 44 against the collar circles of the tyre utilising the scissor mechanism 47.

The supporting shoes 44 are moved by means of the scissor mechanism 47 that may be driven by a manually operated screw spindle mechanism, or in a manner illustrated in FIG. 7, applying pneumatic cylinders 50. In case pneumatic fastening is applied, the pressure-holding container is the tyre mounting shaft 26 itself, to which pressuring air is fed through feed nipples 45 disposed at both ends of the shaft as shown in FIG. 6.

The milling forward-moving (forward-feed) of the tyre 14 is provided by the rotation of the tyre mounting shaft 26. The tyre mounting shaft 26 is rotated by means of the driven rollers of the support mechanisms 28. The rotation velocity range of the shaft is determined such that it allows for reaching the forward-feed rates specified above in relation to the inventive method.

The manner of securing and driving the tyre mounting shaft 26 is illustrated in FIGS. 8, 9. Due to the significant torques occurring as the tyre mounting shaft 26 is rotated, the shaft is preferably driven applying multiple sprocket-chain gears 56 driven by the drive unit 54. In FIG. 8 the opened position of the clamp 34 is illustrated, wherein the shaft may be removed from or inserted in the apparatus. As shown in the figure, in this position the tyre mounting shaft 26 can be easily inserted in the support mechanism 28. FIG. 9 illustrates the closed position of the clamp 34 that is applied during the milling operation.

A further functionality of the support mechanism 28 adapted for driving the tyre mounting shaft 26 is adjusting the distance between the tyre surfaces to be milled and the milling head assemblies 12. Besides other reasons, the adjustability of the distance is required primarily because with different milling parameters the optimum operating point of the milling nozzles may be different compared to the nozzles applied previously, and thereby when a nozzle is replaced it is also necessary to adjust the operating distance.

The initial distance is set by means of a spindle mechanism driven by a wheel 32 comprising a display. In addition to that, a machine-assisted spindle mechanism can be expediently applied to compensate for the increase in the distance between the milling head assemblies 12 and the surface to be milled caused by the thickness reduction of the surface rubber layer.

The milling heads 36, arranged below one another as shown also in FIG. 5, may be set up in two different ways:
the upper and lower milling jets are targeted at the same machining position, i.e. the line of impact of the liquid jets emitted by the first row of nozzles and line of impact of the liquid jets emitted by the second row of nozzles are directed to the same region of the elastomeric material to be milled, or
the upper and lower milling jets are targeted at different machining positions, i.e. the line of impact of the liquid jets emitted by the first and the line of impact of the liquid jets emitted by second row of nozzles are directed to regions of the elastomeric material to be milled, which are different from each other.

A configuration wherein the first row of nozzles 60*a* and the second row of nozzles 60*b* are targeted at the same region of the tyre 58 to be milled is illustrated in FIG. 10A. Directing the upper and lower milling jets, emitted from the first row of nozzles and the second row of nozzles to the same region to be milled seems an obvious solution for concentrating the milling power of the liquid jets. In case the upper and lower milling heads are moved in a coordinated manner, by directing the upper and lower milling jets to the same machining line the effects of the jets are combined, and thus a more intensive milling effect may be theoretically achieved. In practice, however, the milling effect is not doubled for the reasons described below.

The force vectors of the milling jets targeted at the same region of the workpiece are illustrated in FIG. 10B.

As shown in FIG. 10A, let $L_v$ denote the vertical distance between the centre point of the vibration axes of the first row of nozzles 60*a* and the second row of nozzles 60*b*, and let $L_h$ denote the horizontal distance between the midline connecting the axes and the impact points of the milling jets. From the arrangement shown in FIG. 10A the relationship of the respective force vectors $F_f$ and $F_a$ of the upper and lower milling jets may be obtained (as shown in FIG. 10B).

In a manner shown in FIG. 10B, the force vectors may be decomposed into a component $F_m$ perpendicular to the incident tangent, and a component $F_p$ parallel therewith. Since in the present embodiment the upper and lower force vectors have the same magnitude and are axially symmetrical, the components $F_{fp}$ and $F_{ap}$ parallel with the incident tangent cancel out each other as shown in FIG. 10B. An effective milling work is carried out only by the components $F_{fm}$ and $F_{am}$, perpendicular to the incident tangent, which components are necessarily smaller than the magnitude of the original vector. Consequently, the magnitude of the force vector that is effective for the milling operation is smaller than the sum of the scalar values of the upper and lower vectors.

The distances $L_v$ and $L_h$ are predetermined due to construction reasons, and are nearly equal, but depending on the effective milling distance of the nozzles actually applied for milling their proportion may be different therefrom to a small extent. Due to the trigonometric relations determined by the arrangement this means that, despite the doubled milling jet intensity a milling force of only 1.7-1.8 times the original is achieved.

However, practical experience indicates that the intensity of the milling effect is even smaller than expected based on this value of the milling force. One of the reasons for that is independent of the arrangement: the effective mean value of the pulsating milling pressure (the pulsation is caused by the operation behaviour of the applied high-pressure pumps) is approximately 8-10% lower than the maximum pressure value. This phenomenon further reduces the milling effect.

However, the most powerful counter effect which deteriorates milling efficiency is the above described viscoelastic behaviour of elastomeric materials, i.e. the hardening that may occur in the first phase of the method according to the invention. Based on our practical experience it may be established that, despite the doubled energy intake provided by the "dual-row" milling configuration wherein both nozzle rows have the same point of impact, the efficiency of the milling operation is at most 25-30% higher compared to single-row milling, especially in the first phase adapted for disintegrating the surface of the elastomeric material. This is caused primarily by the intensified hardening effect of the two liquid jets acting simultaneously on the elastomeric material.

During our experiments we have come to the recognition that milling efficiency is significantly improved in case the upper and lower milling jets are not targeted to the same point of impact. Thereby, the upper and lower milling jets impact the rubber material at different time instances, implying that the transient hardening effect of the jets is not doubled.

A possible solution for achieving the desired milling effect—i.e. for preventing the doubling of the hardening effect—is arranging the upper and lower milling heads shifted by half of the distance between the nozzles, such that the difference between the horizontal positions of the milling jets equals half of the inter-nozzle distance. In other words, each nozzle of the first row of nozzles should be arranged precisely in the middle between two nozzles in the second row, the nozzles being arranged along two parallel lines. In the present embodiment, therefore, the first and second rows of nozzles are arranged parallel with each other shifted with half the distance between the nozzles.

According to a still more preferred solution, the upper and lower milling heads, i.e., the first and second row of nozzles are vibrated applying a phase shift. This vibration phase shift is ideally equals the half of the inter-nozzle distance, which implies that, for example in case the milling-head vibration is achieved by a rotating drive, a lower and upper drive phase having an inter-phase shift of 90° is required. In an embodiment, therefore, the first and second rows of nozzles are vibrated with a phase shift of 90° compared to each other. However, other preferred phase shift values between the milling jets may also be conceived.

An embodiment is also conceivable wherein the line of impact of the liquid jets of the first and the line of impact of the liquid jets of the second row of nozzles are directed to different regions of the elastomeric material, while
the first row of nozzles and the second row of nozzles are arranged parallel with each other shifted with half of the distance between the nozzles, or
the first row of nozzles and second row of nozzles are vibrated with a phase shift of 90° compared to each other.

In case the first row of nozzles and the second row of nozzles are not directed to the same region of the elastomeric material, these measures are advantageous for example if the liquid jets emitted by the first and the second rows of nozzles impact at the elastomeric material in nearby regions. In this case, the effects of hardening may be reduced by applying the above measures.

In another possible configuration the upper and lower milling jets are directed at different machining positions (the first row of nozzles and the second row of nozzles are targeted at regions of the elastomeric material which are different from each other) as illustrated in FIG. 11. Compared to the configuration wherein the jets are targeted at a single point, the lower tilt angles of the milling heads allows for a higher milling component in the direction of impact, i.e. in this configuration the tangential components of the milling jet vector are reduced. The most preferred direction is the direction perpendicular to the tangent at the point of impact (also shown in the drawing), when the milling vector has no tangential component.

In addition to the general requirements of system control the following special considerations were also taken into account during the design of the control means applied for the method and apparatus according to the invention.

An important requirement of high-pressure liquid jet milling as applied for removing small-sized material particles in a controlled manner is that the liquid jet should be moved with a constant velocity over the workpiece such that the liquid jet penetrates the elastomeric material only to a limited extent (instead of penetrating through it), thereby tearing off only small-sized parts from the surface. As indicated by practical experience, to provide a sufficiently uniform particle size distribution several technological parameters have to be adjusted, preferably independent of one another. One of the fundamental disadvantages of milling technologies applying rotating milling heads instead of the linearly arranged, vibrated liquid jets described above is that for rotating the milling head with a sufficiently high velocity a given and relatively high pressure value is required, which places limitations on other technological parameters. A further disadvantage of rotating-head milling is the intensified impact hardening of the viscoelastic rubber material resulting from the increased milling pressure, which causes a higher specific energy loss.

The milling technology involving linearly arranged and preferably vibrated milling heads, applied also in the apparatus according to the invention, has the significant advantage that the milling parameters such as the forward-feed of the workpiece, the motion of the milling jet, and the milling pressure can be controlled completely independently of one another.

The direct control interventions achievable by controlling the apparatus are the modification of the vibration frequency of the milling jet, and changing the forward-feed rate of the workpiece (i.e., in our case, changing the angular velocity of the tyres to be milled). The milling pressure may be controlled by selecting the nozzle aperture values in the above described manner.

Increasing the vibration frequency basically shifts the particle size in the direction of smaller granulate particle sizes, and therefore the application of higher frequency ranges is more preferable. The practical upper limit is determined by the design and material quality of the mechanical components. The considerations put forward above in relation to the invention may be summarized to the requirement that in order to adequately set the motion parameters it is necessary to control the parameters belonging to the "disintegrating", "productive" and "cleaning" phases of the milling process.

Taking into account the above considerations, the control method should expediently comply with the different kinetic requirements of the different phases of the milling process. In order to achieve that, the control method should basically allow for adjusting the forward-feed rate during operation to different values corresponding to the different milling phases, at the same time maintaining the given milling jet pressure and vibration frequency. The forward-feed rate values corresponding to each phase of the milling process have been specified above.

During the milling process material particles are continuously removed from the elastomeric material, which results in that the machined surface gets further and further away from the optimum operating point of the milling nozzles. As indicated by practical experience, this may become disadvantageous even in case of a difference of only a few millimetres, which—especially when a thicker rubber layer is milled—implies that without adjusting the nozzle distance between subsequent phases, milling efficiency may be deteriorated. This may be compensated for expediently by providing that the distance between the at least one nozzle and the working surface is kept within a tolerance range, e.g. by advancing the tyre mounting shaft support stand utilising a motor, which may be controlled in a synchronised manner with the other motion parameters.

The above described inventive method and apparatus may be applied for milling elastomeric materials, especially for milling the tread surface of elastomeric materials shaped as bodies of revolution (by way of example, tyres) more economically and with improved energy efficiency. The apparatus is made more efficient by the feature that multiple (preferably four) tyres may be arranged in it at the same time, as well as by the above described further features included for increasing the economy of the apparatus.

The invention is, of course, not limited to the preferred embodiments described in details above, but further variants, modifications and developments are possible within the scope of protection determined by the claims.

The invention claimed is:
1. A method for producing milled elastomer, comprising the steps of directing a liquid jet from at least one nozzle (38) on an elastomeric material moving in an at least partially transversal direction with respect to the discharge direction of the at least one nozzle (38), characterized in that the liquid jet directed on the elastomeric material has a pressure of 650-1350 bar, and the elastomeric material is moved with respect to the at least one nozzle (38) such that, in a first phase adapted for disintegrating a surface of the elastomeric material, the elastomeric material has a first forward-feed rate of 10 to 20 mm/s at a point of impact of the liquid jet in a direction transverse to the discharge direction, and, in a second phase after disintegrating the surface, the elastomeric material has a second forward-feed rate being decreased by 35-65% compared to the first forward-feed rate.

2. The method according to claim 1, characterized in that the at least one nozzle (38) has an aperture diameter between 0.4 and 0.6 mm.

3. The method according to claim 1, characterized in that a pressure-volume flow rate nomogram is set up for a nozzle type of the at least one nozzle (38), and, for a given volume flow rate, the pressure of the liquid jet is determined from the range of 650-1350 bar based on an aperture diameter of the at least one nozzle (38) via the pressure-volume flow rate nomogram.

4. The method according to claim 1, characterized in that a pressure-volume flow rate nomogram is set up for a nozzle type of the at least one nozzle (38), and, for a given liquid jet pressure selected from the range of 650-1350 bar, a volume flow rate of the liquid jet is determined based on the aperture diameter of the at least one nozzle (38) via the pressure-volume flow rate nomogram.

5. The method according to claim 1, characterized in that the first forward-feed rate is between 12.5-17.5 mm/s.

6. The method according to claim 5, characterized in that the first forward-feed rate is between 14.2-15.8 mm/s.

7. The method according to claim 1, characterized in that the second forward-feed rate is between 6.5-8.5 mm/s.

8. The method according to claim 7, characterized in that the second forward-feed rate is between 7.1-7.9 mm/s.

9. The method according to claim 1, characterized in that the liquid jet directed on the elastomeric material has a pressure of 850 to 1150 bar.

10. The method according to claim 1, characterized in that a first row of nozzles (60a, 60b) comprising linearly arranged nozzles (38) is applied.

11. The method according to claim 10, characterized by applying dual rows of nozzles comprising the first row of nozzles (60a) and a second row of nozzles (60b) arranged parallel with each other.

12. The method according to claim 11, characterized in that in the course of the method a line of impact of the liquid jets emitted by the first row of nozzles (60a) and a line of impact of the liquid jets emitted by the second row of nozzles (60b) are directed to the same region of the elastomeric material.

13. The method according to claim 11, characterized in that in the course of the method a line of impact of the liquid jets emitted by the first row of nozzles and a line of impact of the liquid jets emitted by second row of nozzles are directed to regions of the elastomeric material, which regions are different from each other.

14. The method according to claim 12, characterized in that the first row of nozzles and the second row of nozzles are vibrated with a phase shift of 90° compared to each other.

15. The method according to claim 1, characterized in that, after the second phase, in a third phase adapted for milling residual material, a forward-feed rate is selected from the same range as the first forward-feed rate.

* * * * *